United States Patent [19]

Greene, Sr. et al.

[11] 3,999,796
[45] Dec. 28, 1976

[54] COLLAPSIBLE AIR DEFLECTOR FOR MOTOR VEHICLES

[76] Inventors: Kenneth W. Greene, Sr.; Lillie L. Greene, both of 1260 Hazelwood, Apt. 201, St. Paul, Minn. 55106

[22] Filed: Oct. 14, 1975

[21] Appl. No.: 622,148

[52] U.S. Cl. ............................................. 296/1 S
[51] Int. Cl.² ...................................... B62D 35/00
[58] Field of Search ............................ 296/1 S, 91

[56] References Cited

UNITED STATES PATENTS

| | | | |
|---|---|---|---|
| 3,596,974 | 8/1971 | Adams | 296/1 S |
| 3,695,673 | 10/1972 | Meadows | 296/1 S |
| 3,731,969 | 5/1969 | Bildfell | 296/1 S |
| 3,768,854 | 10/1973 | Johnson et al. | 296/1 S |
| 3,794,372 | 2/1974 | Webb | 296/1 S |
| 3,904,236 | 9/1975 | Johnson et al. | 296/1 S |

Primary Examiner—M. H. Wood, Jr.
Assistant Examiner—Gene A. Church
Attorney, Agent, or Firm—Merchant, Gould, Smith, Edell, Welter & Schmidt

[57] ABSTRACT

A portable, collapsible air flow deflection apparatus detachably connectable to the roof of a motor vehicle for diverting air flow above and to the sides of the frontal surface of a vehicle in tow behind the motor vehicle. A pair of triangular, planar rigid panels are hinged along common edges and are relatively positioned at an angle thereabout to provide a V-shaped member. An internal planar frame cooperatively engages the hinged panels to fix the shape of the deflection member. Adjustable hold-down means secured to the frame compressively anchor the deflection member to the motor vehicle roof in an upright orientation, presenting a wedge-shaped deflection surface toward the front of the motor vehicle. Hinged and resilient portions along the lower edges of the deflection member adjust to the contour of the motor vehicle roof for presenting a continuous air deflection surface therewith. Wing-like extensions can be removably secured to the hinged panels to extend rearwardly therefrom for increasing the size of the air deflection pattern for use with towed vehicles having larger frontal surface areas.

23 Claims, 13 Drawing Figures

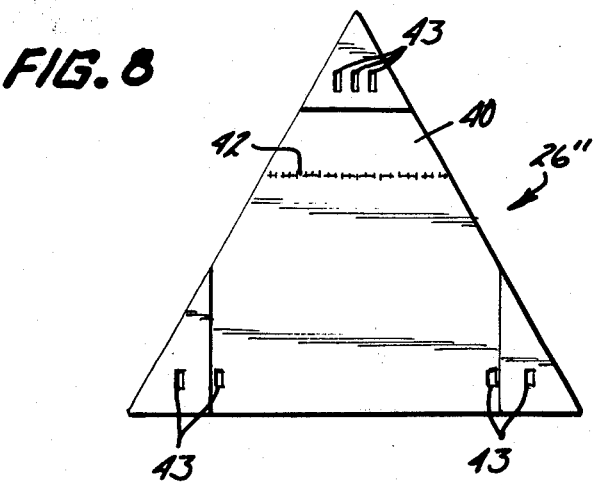
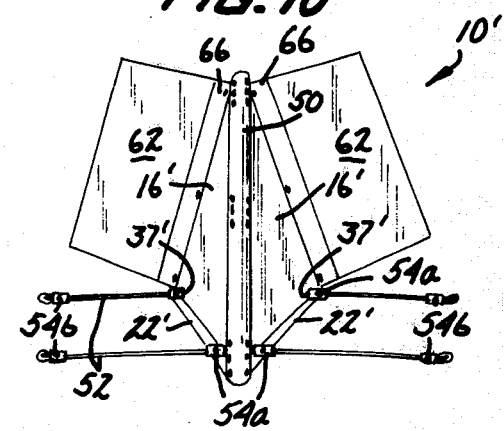
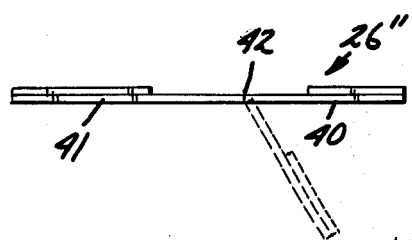
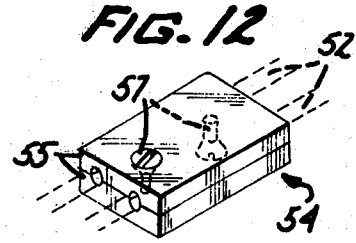
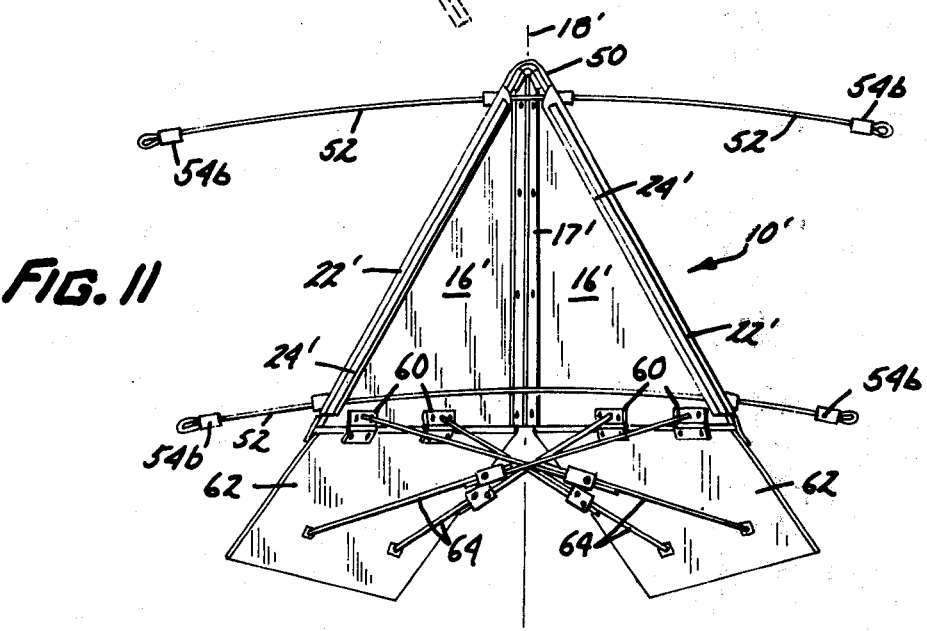
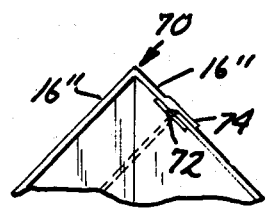

COLLAPSIBLE AIR DEFLECTOR FOR MOTOR VEHICLES

BACKGROUND OF THE INVENTION

1. Field of the Invention

This invention relates generally to portable air deflectors, and more particularly to a collapsible portable air deflector apparatus securable to the roof of an automobile for deflecting air streams away from a trailing vehicle.

2. Description of the Prior Art

Air flow deflection apparatus for motor vehicles for diverting air streams away from the leading blunt surface of a trailing vehicle are generally known in the art. Such air flow deflection apparatus can be generally classified into three major classifications, according to the manner and place of attachment and to the use to which the particular air deflector apparatus is put.

A first general classification includes those air deflectors which are permanently secured to or form an integral part of the towing vehicle. The air deflectors within this classification are typically secured to the cab of a tractor-trailer combination for deflecting air currents away from the front surface of the trailer in tow by the tractor. The air deflectors in this classification generally comprise solid, specially molded configurations which are particularly adapted for permanent affixation either directly to the tractor's roof or to the rear surface of the tractor's cab with an upper deflector portion extending above the general plane of the cab roof. These devices are typically sized for special fitting to the cab with which they are to be employed, are generally non-portable heavy/bulky devices which are designed for continuous use with a particular tractor cab and are not designed with the intent of ease of removal from the cab.

Within the last decade, the increased enthusiasm for camping and the use of towable camping vehicles has created another major application for air flow deflectors within the recreational and sports arena. In most recent years, the energy crisis, and particularly with respect to shortages of petroleum products, has placed increased enphasis on the conservation of petroleum used for mobilizing recreational vehicles. Such considerations have been prime factors involved in the development of low profile or vertically collapsible camping trailers. The drag factor attributable to wind resistance against the front surface of a vehicle in tow can be many cases produce an increase in gasoline consumption by the towing vehicle of greater than 50%. Besides the increased gasoline consumption, the engine of the towing vehicle is forced to work much harder over extended periods of time than those conditions for which it was designed, reducing engine life, further attributing to energy conversion inefficiencies, and proportionately increasing the emission of pollutants into the air.

Accordingly, the second and third general prior art classifications of air deflectors apply to solving the air stream drag problems of towable vehicles such as mobile homes, recreational and camping trailers and the like. The second classification of air deflectors generally includes those air deflection apparatus which are physically secured to the leading surface of the detachable towed vehicle.

Since air deflectors within this classification are typically designed for use with that particular towed vehicle with which they are to be employed, the design of these deflectors generally varies to suit the size and shape of the towed vehicle. These devices are generally bulky and non-portable and are shaped to form an integral part of the towed vehicle or as a permanent fixture thereof. Further, their effectiveness in diverting the main air stream away from the forward surface of the towed vehicle is decreased since the encountered air stream must physically engage the towed vehicle itself before the deflection process occurs.

The third prior art general classification of air flow deflectors, include portable wind deflectors designed for removable attachment to the roof of a motor vehicle. Such deflectors, besides offering the versatility of deflecting air flow currents from a towed vehicle of any configuration, are theoretically designed for use with automobiles having varied roof configurations and sizes, and offer the advantage of continuing that air flow deflection initially provided by the automobile proper, out and away from the automobile such that these deflected air currents bypass the towed vehicle. This invention particularly applies to the type of air flow deflectors generally classified within this group, to which the following observations apply.

Since a portable air stream deflector for removable connection to a motor vehicle roof is generally employed for only relatively short periods of overall use of the vehicle, it becomes highly desirable to design the air deflector for ease of storage when not in use. However, the design criteria which serve to satisfy the ease of storage requirement generally run contra to those criteria required for maximizing the air stream deflection properties of the apparatus. For example, ease of storage dictates that flat, thin, collapsible and light-weight apparatus be employed; whereas maximization of air stream deflection dictates that a non-flat, plow, V-shaped or aerodynamically configured apparatus be employed. The prior art portable roof-top deflectors have not provided a design which optimizes both the deflection and the storage requirements of such a device.

Those prior art portable devices which have addressed the storage problem typically employ a single air deflecting member attached to the roof of a towing vehicle which is inclined rearwardly and upwardly from a position near the front edge of the roof to deflect the encountered air stream primarily above the front surface of the towed vehicle. Such devices generally require a relatively lengthy air deflector member of heavy construction to withstand the extreme air pressures applied thereto and also require rugged hold-down means to secure the deflector to the vehicles roof. Other prior art portable air deflectors use pairs of upright rectangular panels hinged together at one end and mounted to the roof of an automobile such that the hinge axis is perpendicular to the direction of travel of the vehicle. This type of apparatus, while offering some advantages of collapsability for ease of storage, provides air flow deflection primarily to the sides of the towed vehicle and requires heavy structural design for providing height adjustment of the deflection panels to correspond to the height of the trailer pulled by the automobile. This type of structure, by deflecting the air stream only to the sides of the vehicle also requires relatively heavy construction to withstand the severe air flow currents and lift forces to which it was subjected, and itself provides a measure of drag to the automobile.

To the contrary, those portable prior art air stream deflectors which employ aerodynamically contoured designs or contoured plow-shaped designs for simultaneously diverting the encountered air stream both over and to the sides of the towed vehicle, have been designed in rigid one-piece construction, generally by means of a molding process. Such prior art devices have been cumbersome to handle and difficult to store when not in use.

The present invention overcomes these disadvantages of the prior art, and provides an efficient air stream deflection apparatus for simultaneously deflecting an encountered air stream above and to the sides of the towed vehicle when in use, while collapsing to a compact, lightweight and easily storable configuration when not in use. While particular materials will be described in connection with the preferred embodiment of the invention, it will be understood that the invention is not limited to the use of these materials. Further, while the preferred embodiment uses a specific shape of deflector panels, it will be understood that other planar configurations could equally well be employed within the spirit and intent of this invention. Further, while specific tie-down strap configurations are described for mounting the preferred embodiment deflector apparatus to the roof top of a motor vehicle, it will be understood that other mounting configurations could equally well be employed within the spirit and intent of this invention.

SUMMARY OF THE INVENTION

The present invention provides a collapsible portable air deflection apparatus which optimizes both the desired characteristics of air deflection when operable and ease of storage when not in use. The air deflection apparatus comprises a collapsible air deflector, a cooperating frame for defining the operational attitude of the air deflector and for providing structural support, and hold-down apparatus for securing the frame and air deflector to the roof of a motor vehicle.

A pair of planar triangular like-sized air deflection panels are hinged along common edges thereof about a juncture axis and are movable relative one another about that juncture axis for compact, generally planar storage when not in use. The air deflection panels cooperatively form a wedge shaped air deflection member which mounts upon the roof of a motor vehicle. When mounted upon a motor vehicle, the lower edge of the joined air deflector panels operatively engage the roof of the motor vehicle and are spread relative one another about the juncture axis such that the juncture axis projects at an angle to the horizontal upwardly from the motor vehicle roof and rearwardly toward a vehicle in tow by the motor vehicle. The hinge joining the pair of deflector panels may be a continuous flexible hinge extending the entire longitudinal length of the joined panel edges to prevent passage of air therebetween.

Continuous elongate hinges are also connected to those lower edges of the panels which lie adjacent the roof of the motor vehicle, some that the movable portions of the elongate hinges extend toward and project into the internal cavity formed by the air deflector panels with the motor vehicle roof. A strip of resilient material is bonded to a lower portion of the elongate hinges and directly engages the roof of the motor vehicle for providing continuous sealing engagement of the deflector panels with the motor vehicle roof.

A generally triangular frame cooperatively engages the air deflecting panels along their lower edges and rests upon the inwardly extending portions of the elongate hinges within the internal cavity, giving shape to the air deflection apparatus while adding structural support along the lower edges of the air deflector panels. The frame may be of planar rigid construction, of adjustable size, or may be designed to double as a luggage rack for holding luggage within the internal cavity within the pair of air deflectors. The frame sandwiches the extended portions of the elongate hinges and their attached resilient material between its lower surface and the motor vehicle roof.

A plurality of hold-down straps secure the frame to the motor vehicle roof from positions oppositely disposed therealong and extend through passageways through the air deflector panels for causing the air deflector panels to become oriented in an upright attitude while insuring firm compressive engagement of the panels to the motor vehicle roof. The lower hinges with attached resilient material provide for a continuous air flow deflection path with the roof of the motor vehicle.

A pair of wing-like air deflector extensions may be removably secured to the air deflector panels near their trailing edges. A collapsible/extendable support frame within the internal cavity of the apparatus allows the wing-like extensions to be positioned so as to either provide a generally planar extension of the primary air deflector panels or, alternatively, to alignment at any one of a plurality of angular positions with respect to the primary deflector panels, enabling an operator to selectively vary the air deflection angle rearward from the deflector apparatus. The adjustable feature provided by the wing-like extensions in combination with their cooperative adjustable frame, makes the air deflector apparatus of this invention adaptable for providing air deflection patterns for accommodating all sizes and configurations of towed vehicles.

BRIEF DESCRIPTION OF THE DRAWING

Referring to the Drawing wherein like numerals represent like parts throughout the several views:

FIG. 8 is a top plan view of a solid foldable embodiment of the lower frame portion of the preferred embodiment disclosed in FIG. 1;

FIG. 9 is a side elevational view of the lower frame portion disclosed in FIG. 8 illustrating the hinged movement of the foremost portion of the frame member;

FIG. 10 is a perspective view of a second embodiment of the invention which includes rearwardly extending winglike air deflector members, as viewed from an elevated frontal position;

FIG. 11 is a bottom plan view with the lower frame member removed, of that embodiment of the invention disclosed in FIG. 10;

FIG. 12 is an enlarged perspective view of a cable clamp of the hold-down means illustrated in that embodiment of the invention disclosed in FIG. 10; and FIG. 13 is a partial sectional view illustrating an alternate hinge configuration for the forward V-shaped edge of the air deflecting apparatus of this invention.

DESCRIPTION OF THE PREFERRED EMBODIMENT

Figure 1:
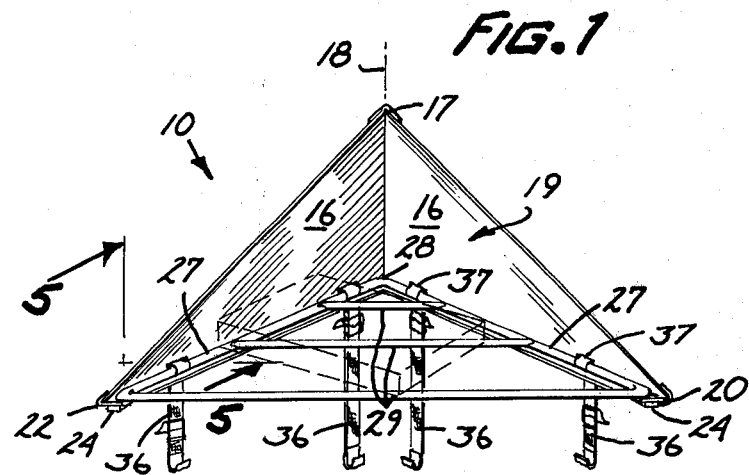
FIG. 1 is a perspective view of a preferred embodiment of the invention, viewed from an elevated rear position.
Figure 3:
FIG. 3 is a diagrammatic view of the air deflector apparatus of the preferred embodiment disclosed in FIGS. 1 and 2 as it would appear in operative use on the roof of a motor vehicle.
Figure 2:
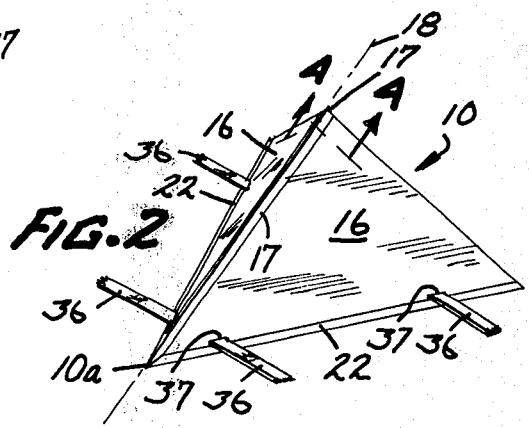
FIG. 2 is a perspective view of the preferred embodiment disclosed in FIG. 1, as generally viewed from an oblique angle taken from an upper side position; and with portions thereof broken away.

Referring to the Figures, a portable air flow deflector apparatus 10 of the preferred embodiment, is illustrated in operational upright configuration in FIGS. 1 through 3. The air deflector 10 is illustrated in FIG. 3 as it would operatively appear when secured to a roof 11 of a motor vehicle 12, towing a trailer 14 which has a broad front wall 15 normally offering significant wind resistance for impeding the forward motion of the motor vehicle 12.

Figure 4:
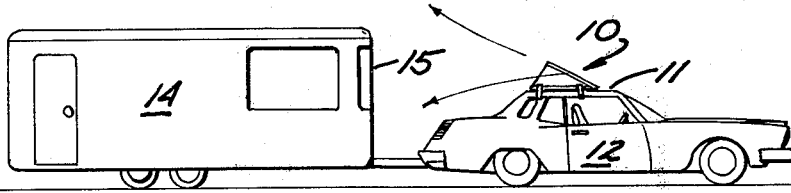
FIG. 4 is a cross-sectional view of the upper hinged connection of the air deflector panels disclosed in FIG. 2, generally taken along the line 4—4.
Figure 4:

The air deflector apparatus 10 has a pair of triangular like sized deflection panels 16 connected by means of a hinge 17 which extends along the entire length of a common first edge of each of the deflection panels 16. The elongate hinge 17 enables pivotal motion of the deflection panels 16 about a juncture axis 18. The deflection panels 16 are rigid members, constructed in the preferred embodiment of plexiglass, each having a broad flat surface for diverting air flow impinging thereon. It will be understood that other rigid materials such as aluminum or wood could also be used for the deflection panels 16. In the preferred embodiment the hinge 17 is made of flexible plastic material and is secured to the outer surfaces of the deflection panels 16, as illustrated in FIG. 4, to continuously seal the juncture therebetween from air flow currents, and provides structural strength to the air deflector apparatus 10 along the juncture axis 18.

The air deflector apparatus 10 is operatively positioned upon the motor vehicle roof 11, as herein after described, such that the deflection panels 16 operatively form an inverted V, wedge shaped surface for intercepting air flow currents as the motor vehicle proceeds in a forward direction. The juncture axis 18 obliquely extends from the motor vehicle roof 11 from a foremost portion 10a of the air deflector apparatus 10, upwardly and rearwardly towards the towed vehicle. As operatively positioned upon the motor vehicle roof 11, the hinged deflection panels 16 define therewith an internal cavity, generally designated at 19.

Figure 5:
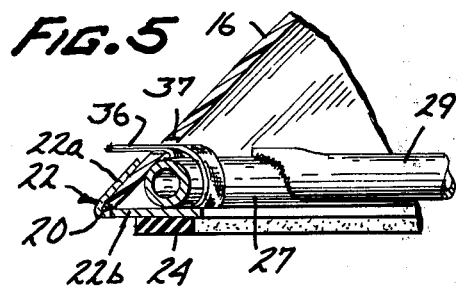
FIG. 5 is a cross-sectional view, with portions thereof broken away of the lower hinged portion of the air deflector panels disclosed in FIG. 1, generally taken along the line 5—5.

Each of the deflection panels 16 has a second, lower edge generally designated at 20, operatively joining at the juncture axis 18 at the foremost point 10a of the air deflector 10 and operatively diverging outwardly therefrom along the upper surface of the motor vehicle roof 11. Elongate hinges 22 are operatively connected along the entire length of each of the lower edges 20 of the panels 16. The elongate hinges 22 each has a first portion 22a (see FIG. 5) secured to the outer surface of the deflection panel 16 and a second portion 22b, movable with respect to the first hinge portion 22a about the longitudinal axis of the hinge 22, and projecting inwardly toward the center of the motor vehicle roof within the internal cavity 19. A strip of resilient sponge or rubber material 24 is secured to the lower outer surface of each of the movable portions 22b of the hinges 22 and extend along their entire length for directly engaging the motor vehicle roof 11. The hinges 22 are movable about their longitudinal hinge axes, movably conforming to the slight contour of the roof 11 of the motor vehicle 12 such that the resilient material 24 engages the motor vehicle roof 11 along the entire length of the lower portion 22b of the hinge 22, forming a tight seal therewith. When compressively engaging the roof 11 of the motor vehicle 12 under force of the hold-down straps, hereinafter described, this tight sealing engagement increases the rigidity of the air deflector 10 against vibration and lift which would otherwise be caused by air flow currents passing between the lower edges 20 of the panels 16 and the motor vehicle roof 11.

The oblique angle which the juncture axis 18 forms with the roof 11 is determined by the relative positioning of the deflection panels 16 about their juncture axis 18, which in turn is fixed by a lower planar frame 26 positioned near the bottom of the internal cavity 19 in a plane generally parallel to the general plane of the motor vehicle roof 11. The angle as measured within the internal cavity about the juncture axis 18 which is formed between the deflector panels 16 will hereinafter be referred to as the air deflection angle, and is directly determined by the size and configuration of the lower frame 26. In the preferred embodiment, the lower frame 26 is of generally tubular A-frame construction having a pair of primary brace members 27 operatively connected at and outwardly diverging from an apex 28 and having a plurality of cross-brace members 29 secured thereto at longitudinally spaced positions therealong. The lower frame 26 illustrated in FIGS. 1 and 5 of the preferred embodiment is a rigid frame wherein the primary and cross brace members 27 and 29 respectively are rigidly secured to one another as illustrated by the weld between the primary and cross brace members in FIG. 5. In the preferred embodiment, the frame 26 is constructed of tubular plastic material; however, it will be understood that other frame materials and construction could equally well be employed within the spirit and intent of this invention.

The primary brace members 27 of the lower frame 26 rearwardly diverge from the apex 28 to form a V-shape and are sized in length to fit within the internal cavity 19 formed by the deflection panels 16, as illustrated in FIG. 1. The extended bottom portions 22b of the hinges 22 are of sufficient width such that the primary brace members 27 of the frame 26 rest upon their upper surfaces (see FIG. 5) while simultaneously engaging the inner surfaces of the deflection panels 16 near their lower edges 20. The primary brace members 27 are positioned in generally vertical alignment with the strips of resilient material 24 so as to excerpt downward pressure thereon along the length of the hinge 22. When so inserted within the cavity 19 as illustrated in FIG. 1, the angular displacement of the primary brace members 27 of the lower frame 26 define the triangular base dimensions of the air deflector 10 while the frame proper 26 adds structural support along the lower edges 20 of the panels 16.

Figure 7:
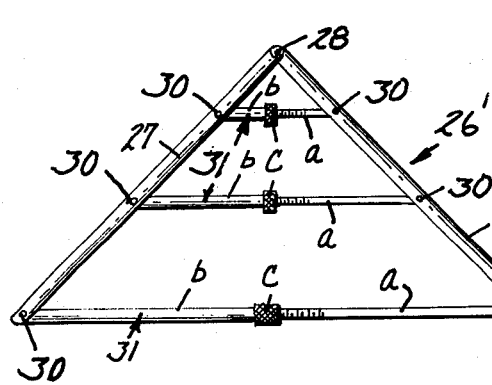
FIG. 7 is a top plan of an adjustable embodiment of the lower frame portion of the preferred embodiment disclosed in FIG. 1.

Since the lower frame 26 defines the lower triangular shape of the air deflector 10, thus also defining the deflection angle and the angle which the juncture axis 18 forms with the horizontal, these angles can be varied by varying the size and shape of the frame 26. An embodiment of an adjustable lower frame 26 is illustrated in FIG. 7. Referring to FIG. 7, the primary brace members 27 are hinged at their apex 28 for providing variable angle adjustment therebetween, and the cross-brace members 29 are each hingedly connected to the primary brace members 27 at 30. The lengths of the individual cross-brace members 29 are adjustable, as illustrated generally at 31, to provide variable angular positioning of the primary brace members 27 about their apex 28. In the preferred embodiment the variable cross-brace capability is provided by an inner threaded tube 31a which projects within a larger outer tube 31b a distance as determined by the coupling nut 31c. However, other adjustable techniques are anticipated within the spirit and intent of this invention. An adjustable frame is desirable for varying the "pitch" of the juncture axis 18 relative the motor vehicle roof 11, to change the "effective" height of the air deflector 10, and also permits use of single sized deflection panels 16 for use with any size of motor vehicle roofs 11.

A plurality of tie-down straps 36 have a first end thereof securely attached to the primary brace members 27 of the tubular at frames oppositely disposed positions therealong, with one each of the straps 36 being positioned near the foremost point 10a of the air deflector 10, and one each of the straps 36 being positioned near the rearward portion of each of the primary brace members 27. The main body of each of the tie-down straps 36 extends through one of a plurality of openings 37 (see FIG. 5) formed within the deflection panels 16. Each of the straps 36 has a suitable adjustment means, of a type well-known in the art, for adjusting the length of the straps to accommodate motor vehicle roofs 11 of varied widths. In the preferred embodiment, the free ends of the tie-down straps 36 terminate in a truncated U-shaped channel for clamping engagement to the rain gutters of the motor vehicle roof 11. When secured to the motor vehicle roof, the tie-down straps 36 excerpt downward pressure upon the lower frame 26 and inward pressure upon the deflection panels 16 by means of the openings 37, causing the deflection panels 16 to compressively engage the frame 26 while simultaneously causing the lower frame 26 to compressively sandwich the lower hinge portion 22b and the resilient material 24 between the frame and the motor vehicle roof 11 for securely anchoring the air deflector 10 to the roof.

The anchored air deflector 10 thus presents a continuous inverted V, wedge-shaped air deflection surface with the motor vehicle roof 11 for diverting air flow which would otherwise normally impinge upon the front surface 15 of the trailer 14, above and to the sides of the trailer 14. The inverted V-wedge shaped structure of the air deflector 10 also causes the encountered air flow currents to exert a downward pressure upon the roof 11 of the motor vehicle 12, thus increasing the traction of the motor vehicle 12. The operative configuration of the air deflector 10 also cuts the encountered air flow in a manner offering minimum resistance thereto while deflecting the air flow above and to the sides of the trailer 14.

Figure 6:
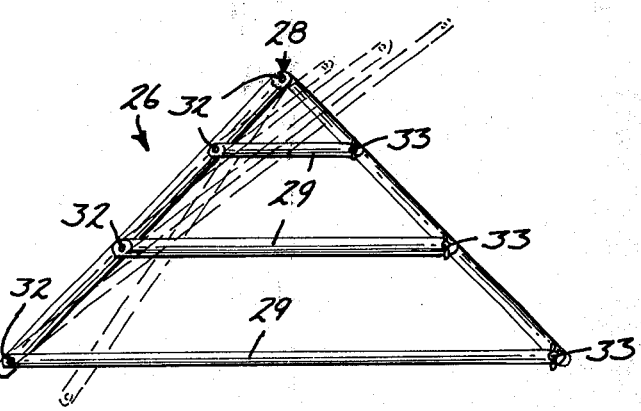
FIG. 6 is a top plan of a collapsible embodiment of the lower frame portion of the preferred embodiment disclosed in FIG. 1.

The lower frame may also be constructed so as to be collapsible when not in use, as illustrated at 26' in FIG. 6. Referring to FIG. 6, the primary brace members 27 and one end of the cross brace members 29 are pivotally connected as illustrated at 32. The opposite ends of the cross brace members 29 are detachably connected to the primary brace member 29 at 33 by means of a wingnut assembly or the like, for enabling complete collapsible storage of the frame 26' when not in use, as illustrated by the dashed lines in FIG. 6. Since the deflection panels 16 are planar rigid members hinged about the juncture axis 18, they also can be folded upon one another about the juncture axis to form a generally planar easily storable triangular sheet.

A third embodiment of a collapsible lower frame member is illustrated at 26'' in FIGS. 8 and 9. This frame member is constructed of solid rigid material having first and second frame prieces 40 and 41 hinged at 42 for ready collapsible folding when not in operative use. The lower frame member 26'' has a plurality of openings 43 therethrough adjacent the apeces of the frame to which the tie-down straps 36 are secured. Those portions of the lower frame member 26'' adjacent its apeces are constructed of double thickness material for providing added strength to windstand the stresses exerted thereon by the tie-down straps 36.

The frame 26 is also designed to serve as a luggage rack for supportingly retaining luggage articles within the internal cavity 19, as illustrated in dashed lines in FIG. 1. Additional luggage hold-down straps can be secured to the cross brace members 29 of the frames 26 or 26' and to the body proper of the frame 26'' for securely retaining the luggage within the cavity 19 without interferring with the operation of the deflector.

A second embodiment of an air deflector apparatus constructed according to the principles of this invention is illustrated at 10' in FIGS. 10 and 11. Referring thereto, parts of like function to those disclosed with respect to FIGS. 1-5 are designated by numerals of like number followed by a prime (') designation. A pair of triangular like-sized generally rigid deflector panels 16' are connected by means of a hinge 17' extending substantially along the entire length of a common first edge of the deflection panels 16', pivotally connecting the panels about a juncture axis 18'. In this embodiment, the hinge 17' is secured to the inner surfaces of the panels 16' and is of piano-hinge construction. A first flexible continuous strip 50 is connected to the outer surface of the panels 16' along their commonly hinged edges and covers the space therebetween to prevent wind whistling sounds from being created thereat.

A pair of elongate hinge members 22', having strips of resilient material 24' secured to their lowermost edges, are connected along substantially the entire length of each of the lower edges 20' of the panels 16'. A triangular lower frame member, such as 26, 26' or 26'', (not illustrated in FIGS. 10 and 11, rests upon the upper surfaces of the lower hinge members 22' and engages the inner walls of the panels 16' along their lowermost edges, to define the deflection angle of the apparatus, as previously described with respect to the first embodiment of the air deflector apparatus.

A pair of tie-down cables 52 continuously extend through openings 37' in the deflector panels 16', for securing the assembly to the roof of a motor vehicle. Each of the cables as illustrated in FIGS. 10 and 11 passes through a pair of adjustable cable clamps 54a adjusted along the length of the respective cable 52 to just engage the outer walls of the deflector panel 16' near the holes 37' therethrough for preventing lateral movement of the air deflection assembly 10' relative to the tie-down cables 52.

A second pair of cable clamps 54b near the respective ends of each of the cables 52, form the cable ends into loops for ready attachment by appropriate clamping means (not illustrated) to the roof, rain gutters or the like of the motor vehicle. Typical construction of the cable clamps 54a and 54b, well known in the art, is illustrated in FIG. 12. The cable clamps comprise a pair of plate members 55 each having a pair of elongate grooves formed therein, which grooves of the two plates cooperatively align with one another to form a pair of cylindrical channels 56 through the clamp body. The clamp is placed along the cable 52 at the desired position, with the cable 52 passing through the channels 56, and the plates are then secured to one another by means of screws 57, thus fixedly clamping the cable position relative to the body of the clamp.

Each of the deflector panels 16' has one or more hinge members 60 secured at its trailing edge for hingedly securing a rearwardly projecting wing-like extension 62 to the deflector panel 16'. The hinge members 60 are in the preferred embodiment, of a configuration such that the hinge pins thereof can be rapidly removed therefrom, for rapid detachment of the wing-like extension 62 from the deflector panels 16' either when their use is not desired or for storage purposes. The wing-like extensions 62 are pivotal for in-line (planar) alignment with their respectively connected deflector panel 16', or can be pivoted with respect thereto so as to form an outwardly projecting extension thereof, as illustrated in FIG. 10. A pair of adjustable brace members 64 secure each of the wind-like extensions 62 to the oppositely disposed deflector panel 16' (see FIG. 11) at the desired deflection angle. In the embodiment illustrated in FIG. 11, each of the brace members 64 comprises a pair of rigid rods adjustably connected along their length by means of a clamping assembly very similar to the cable clamp apparatus illustrated in FIG. 12. Further, the opposite ends of each of the brace members 64 is configured for removable connection to either the wing-like extension 62 or the deflector panels 16' such that the brace members 64 can be rapidly removed from the air deflector apparatus for storage purposes. It will be understood that while a particular hinge structure (60) and bracing structure (64) have been disclosed with respect to the positioning and stabilizing of the wing-like extensions 62, many variations thereof can be configured by those skilled in the art, within the spirit and intent of this invention.

A pair of flexible continuous wind-shielding strips 66 are connected to the trailing edges of the deflector panels 16' and flexibly engage the outer surfaces of the wing-like extensions 62 adjacent their foremost edges to prevent wind whistling sounds from being created thereat. The wing-like extension 62 and associated bracing 64 is operable to selectively increase the air deflection angle of the air deflecting apparatus 10', for deflecting air currents above and to the sides of towed vehicles having significantly large frontal areas. Keeping within the intent of this invention, however, the wing-like extensions 62 are configured for rapid removal and/or collapsement with the primary air deflecting panel 16' when not in operative use or for storage purposes.

While the first and second embodiments of the invention have disclosed air deflector apparatus 10 and 10' utilizing a hinged leading V-shaped edge, other collapsible configurations are envisioned within the spirit and intent of this invention. One such alternate hinged construction of the air deflector apparatus is illustrated in FIG. 13. Referring thereto, the leading V-shaped edge of the air deflector apparatus is illustrated in cross-sectional view at 70 as being of continuous rigid shape connecting the primary air deflection panels 16''. One of the panels 16'' is hinged at a position spaced rearwardly back from the V-shaped leading edge at 72 such that the hinged panel 15'' can be pivotally rotated about its hinged axis (in the clockwise direction as viewed in FIG. 13) to the collapsed position illustrated in dashed lines in FIG. 13, for storage purposes. That air deflector panel 16'' which is hinged is configured to contain an overlapping flap member 74 extending from the portion of the air deflector panel 16'' directly adjacent the V-shaped leading edge and extending rearwardly over the hinged juncture to prevent the formation of whistling sounds caused by deflected air currents. It will be understood that while the above-described "side-type" hinge configuration has been described with respect to its use relative to the leading edge of the air deflector apparatus, its principles can equally well be applied to the hinged juncture between the deflector panels 16' and wing-like extension 62 as illustrated in FIGS. 10 and 11.

While we have disclosed several preferred embodiments of our invention, it is to be understood that these have been for the purposes of illustration only and that our invention is to be limited solely by the scope of the appended claims.

What is claimed is:
1. Portable air flow deflector apparatus detachably connectable to the roof of a motor vehicle for reducing the air drag of a vehicle in tow by said motor vehicle by deflecting encountered air flow away from a forward surface of the towed vehicle, comprising:
   a. collapsible air deflection means mountable on said motor vehicle roof for deflecting air flow above and to the sides of said vehicle in tow, comprising:
      i. a first pair of like sized air deflecting panels each having a planar generally triangular surface for deflecting air flow;
      ii. first hinge means for connecting said pair of air deflecting panels along first corresponding edges thereof, defining a first hinge axis therealong; and
      iii. second hinge means connected along second corresponding edges of each of said pair of air deflecting panels for providing operative engagement of said second panel edges with said roof, said second hinge means providing variable angular engagement of said deflecting panels relative the general plane of said roof;
   b. a generally planar triangular frame oriented generally parallel to the general plane of said roof and cooperatively engaging said second hinge means and said pair of air deflecting panels along their said second edges, said pair of air deflecting panels cooperatively engaging said frame to define a fixed air deflection angle between said deflecting panels about said first hinge axis; and
   c. hold-down means operatively connected with said frame and with said air deflection means for securing said air deflection means to said roof under compressive pressure of said frame such that said first hinge axis obliquely diverges upward from the general plane of said roof and toward said towed vehicle.

2. Portable air flow deflector apparatus as recited in claim 1, wherein said first hinge means comprises a continuous hinge operatively connecting said pair of air deflecting panels for movement relative one another and extending the entire length of said first corresponding edges of said panels, to provide a continuous inverted V-shaped surface along said first hinge axis for addressing said engaged air flow.

3. Portable air flow deflector apparatus as recited in claim 2, wherein each of said air deflecting panels comprises a rigid triangular member having a broad planar surface for engaging said air flow, wherein said frame comprises a triangular tubular frame cooperatively engaging said air deflecting panels to cause said air deflecting panels to present a wedge inverted V-shaped air flow deflection surface to said encountered air stream for deflecting said air stream above and to the sides of said towed vehicle.

4. Portable air flow deflector apparatus as recited in claim 1, wherein said second hinge means comprises:
   a. a pair of elongate hinges, one each of said hinges continuously extending along the entire length of said second edge of a respective one of said air deflecting panels, for operatively bending to conform to the contour of said motor vehicle roof; and
   b. resilient means secured along the length of each of said pair of elongate hinges for providing continuous sealing engagement of said elongate hinges with said motor vehicle roof along the entire length of said respective second edges of said air deflecting panels.

5. Portable air flow deflector apparatus as recited in claim 4, wherein a first portion of each of said elongate hinges is secured to the outer surface of its respective air deflecting panel, wherein a second portion of each of said elongate hinges movable with respect to said first portion thereof, movably forms an acute angle relative said first hinge portion such that said second hinge portion engages said motor vehicle roof and projects inwardly of the outer surface of its respective air deflecting panel toward the center of said motor vehicle roof; and wherein the bottom surface of said frame rests upon said inwardly projecting second portions of said elongate hinges, compressively sandwiching said second portions along the lengths of said elongate hinges between the frame and the upper surface of said motor vehicle roof.

6. Portable air flow deflector apparatus as recited in claim 5, wherein said air deflecting panels each has a plurality of passageways extending therethrough adjacent their said second edges; and wherein said hold-down means comprises a plurality of adjustable tie-down straps, each characterized by:
   a. a body portion extending through one of said panel passageways;
   b. a first end anchored to said frame adjacent said corresponding passageway;
   c. an opposite end suitable for anchoring to said motor vehicle roof; and
   d. means for adjusting the length of the body portion of said tie-down strap to conform to the size of the motor vehicle roof.

7. Portable air flow deflector apparatus as recited in claim 5, wherein said air deflecting panels each has a plurality of passageways extending therethrough adjacent their said second edges; and wherein said hold-down means comprises a plurality of tie-down cable means, each characterized by:
   a. a body portion continuously extending through aligned ones of said passageways through both of said air deflecting panels;
   b. a pair of clamp stop means adjustably secured to said body portion adjacent to the external surface of each of said air deflecting panels where said body portion passes through said passageway; and
   c. clamp means adjustably secured adjacent the opposite ends of said body portion for anchoring said cable means to the motor vehicle roof.

8. Portable air flow deflector apparatus as recited in claim 1, wherein said triangular frame is further characterized by a pair of primary brace members joined at and longitudinally diverging from an apex lying adjacent a foremost end of said first hinge axis and having a plurality of cross-brace members connecting said primary brace members at positions longitudinally spaced from said apex.

9. Portable air flow deflector apparatus as recited in claim 8, wherein said first hinge means operatively connects said pair of air deflecting panels along said first corresponding edges thereof to enable movement of said air deflecting panels relative one another when not in operative use such that said pair of air deflecting panels identically fold upon one another about said first hinge axis, and wherein said primary brace members and said plurality of cross-brace members of said frame are pivotally connected to one another in a manner permitting collapsible folding of said frame when not in operative use.

10. Portable air flow deflector apparatus as recited in claim 8, wherein said primary brace members of said frame are pivotally connected at said frame apex and wherein said frame cross-brace members include means for adjusting their respective lengths for varying the angle defined between said primary brace members about said apex, thus predictably varying said deflection angle between said panels and the angle said hinge axis forms with said roof.

11. Portable air flow deflector apparatus as recited in claim 1, wherein said triangular frame member is of solid construction having two edges thereof cooperatively engaging said deflector side panels, said frame member being hinged along its length in one direction for collapsible storage when not in use and having reinforced portions near its apeces for cooperatively engaging said hold-down means.

12. Portable air flow deflector apparatus as recited in claim 1, further comprising:
   a. a second pair of generally planar rigid air deflecting panels;
   b. means for removably connecting said second pair of rigid deflector panels to said first pair of deflecting panels along the trailing edges of said first air deflecting panels, forming rearwardly extending wing-like extensions thereof; and
   c. bracing means operatively connecting said first and second pairs of air deflecting panels for maintaining a predetermined angular disposition of said second pair of air deflecting panels relative to said first pair of deflecting panels.

13. Portable air flow deflector apparatus as recited in claim 12, wherein said second pair of air deflecting panels are pivotally connected to said first pair of air deflecting panels and wherein said bracing means includes means for adjusting the angular disposition of said second pair of air deflecting panels relative to said first pair of air deflecting panels.

14. Collapsible air flow diverter apparatus for use with a motor vehicle towing a trailer characterized by a front surface of substantially broad lateral area, comprising:
   a. a wedge V-shaped air deflector having opposite planar deflector side panels of substantial broad lateral area each having a first edge terminating at and diverging rearwardly from a juncture axis which projects at an angle to the horizontal, and having a lower edge oriented to operatively engage the roof of said motor vehicle, said wedge shaped air deflector and said motor vehicle roof defining an internal cavity therebetween;
   b. hinge means for continuously connecting said side panels along their said respective first edges along said juncture axis;
   c. means operatively connected along the lengths of said lower edges of each of said deflector side panels, pliably conforming to the contour of said motor vehicle roof for causing continuous direct engagement of the entire lower edges of said deflector panels with said motor vehicle roof;
   d. frame means cooperatively engaging the lower inner surfaces of said deflector side panels for fixedly positioning said side panels relative one another upon said roof to define a constant air deflection angle about said juncture axis therebetween and for providing lateral support to said lower edges of said side panels; and
   e. means for securedly holding said frame means and said air deflector to said motor vehicle roof in upright position such that said juncture axis projects rearwardly from said roof top toward said towed trailer with said side deflector panels outwardly rearwardly diverging therefrom, thus diverting air flow encountered thereby due to forward movement of said motor vehicle, upward and in opposite outward rearward directions respectively over and to the sides of said towed trailer.

15. Collapsible air flow diverter apparatus according to claim 14, wherein said hold-down means includes elongate continuous hinges connected to each of said lower edges of said side panels and longitudinally extending the lengths thereof, said elongate hinges having an extended portion projecting within said internal cavity and being movable with respect to said side panels; wherein said frame means includes a triangular generally planar frame positionable within said internal cavity which engages the inner surfaces of said deflector panels near their said lower edges and sides and operatively lies upon said extended portions of the elongate hinges; and wherein said hold-down means further includes adjustable strap means secured to said frame and securable to said motor vehicle roof for holding said air deflector to said motor vehicle roof by compressively binding said extended portions of said elongate hinges between said frame and said motor vehicle roof.

16. Collapsible air flow diverter apparatus according to claim 15, wherein those portions of said elongate hinges which are securely connected to the lower edges of said deflector side panels are connected along the outwardly directed surfaces of said side panels, and wherein said means for causing continuous direct engagement of said lower edges of the deflector panels comprises a strip of resilient material connected respectively to those surfaces of said extended hinge portions which lie adjacent the motor vehicle roof for directly engaging said motor vehicle roof as sandwiched between said roof and said extended hinge portion under compressive force from said frame.

17. Collapsible air flow diverter apparatus according to claim 14, wherein said hinge means connecting said deflector side panels along their said first edges comprises an elongate hinge of bendable resilient material continuously extending the entire length of said first edges of said deflector side panels for preventing air flow therebetween along said juncture axis.

18. Collapsible air flow diverter apparatus according to claim 14, wherein said frame means includes a frame member insertable within said internal cavity for supportingly engaging said deflector side panels to provide a base for supporting luggage insertable within said internal cavity.

19. Collapsible air flow diverter apparatus according to claim 14, wherein said frame means includes a triangular collapsible frame member insertable within said internal cavity and cooperatively engaging said deflector side panels, said frame member having a pair of primary brace members pivotally connected at an apex and a plurality of cross-brace members pivotally attached to one of said primary brace members and detachably connected to the other of said primary brace members for enabling said frame member to become collapsible when not in operative use with said air deflector.

20. Collapsible air flow diverter apparatus according to claim 14, wherein said frame means includes a triangular frame member insertable within said internal cavity and cooperatively engaging said deflector side panels, said frame member having a pair of primary brace members pivotally connected at an apex, a plurality of cross-brace members pivotally connected to said primary brace members at positions longitudinally spaced from said apex, and means on said cross-brace members for adjusting their respective lengths for varying the angle defined between said primary brace members about said apex, thus predictably varying said deflection angle between said side panels and the angle said juncture axis forms with said roof.

21. Collapsible air flow diverter apparatus according to claim 14, wherein said frame means includes a triangular frame member of solid construction insertable within said internal cavity and cooperatively engaging said deflector side panels, said frame member being hinged along its length for collapsible storage when not in use and having reinforced portions near its apeces for cooperatively engaging said hold-down means.

22. Collapsible air flow diverter apparatus according to claim 14, further comprising:
   a. a second pair of generally planar rigid deflector panels;
   b. means for pivotally connecting said second pair of deflector panel to said pair of side deflecting panels along the trailing edges of said side deflector panels, forming rearwardly extending wing-like extensions thereof; and
   c. bracing means operatively connected to said second pair of deflector panels for maintaining a predetermined angular disposition of said second deflecting panels relative to said side deflector panels.

23. Collapsible air flow diverter apparatus according to claim 22, further including means operatively operatively connected to said side deflecting panels near their respective trailing edges for continuously closing to air flow the juncture between said side deflector panels and said second pair of air deflector panels, for minimizing air whistling sounds created thereat.

* * * * *